United States Patent Office 3,440,127
Patented Apr. 22, 1969

3,440,127
HEATING RAILS FOR JOINT GLUING MACHINES
Ernst Hunziker, Brugg, Switzerland, assignor to Georg Fischer AG Brugg, Brugg, Switzerland
Filed July 6, 1965, Ser. No. 469,758
Claims priority, application Switzerland, July 7, 1964, 8,909/64
Int. Cl. B32b 31/20
U.S. Cl. 156—583                 8 Claims

ABSTRACT OF THE DISCLOSURE

An apparatus for gluing panels in which two sets of rails are provided supported on respective beams and moveable toward and away from each other and also longitudinal by movement of the respective beams thereby to advance panels through the machine while pressing the panels toward each other and in which at least one set of rails is carried on its respective beam by fluid operable devices that maintain a predetermined controlable thrust on the rail when it is engaged with a panel.

---

The present invention relates to a pneumatically operable apparatus for controlling the pressure of conveying and heating rails of a machine for gluing joints, especially a machine designed as conveying flat press in which at least two beds are provided which comprise conveying and heating rails arranged parallel alongside each other and alternately moving back and forth in longitudinal direction and also adapted alternately to be raised and lowered.

Devices are known in which the pressure acting upon the material to be conveyed is obtained by preloaded springs. If it is necessary, for instance in view of the property or thickness of the material to be conveyed, to change the pressure, this may be effected by means of nuts which with each individual feeding or heating machine are adjusted so as to change the preload of the spring in the desired manner. For this purpose, a skilled operator familiar with the machine is required who carries out the change in the desired spring preload or pressure while requiring a relatively long time for this operation. In practice and especially in shops in which frequently material of different properties and thicknesses is treated, such time consuming adjustment by a skilled operator is rather disadvantageous.

It is, therefore, an object of the present invention to provide a device which will overcome the above mentioned drawbacks.

It is another object of this invention to provide a control device for use in connection with the heating rails of joint gluing machines, by means of which the desired pressure exerted on the material to be conveyed can be controlled from a central station.

These and other objects and advantages of the invention will appear more clearly from the following specification in connection with the accompanying drawings, in which.

Figure 1:
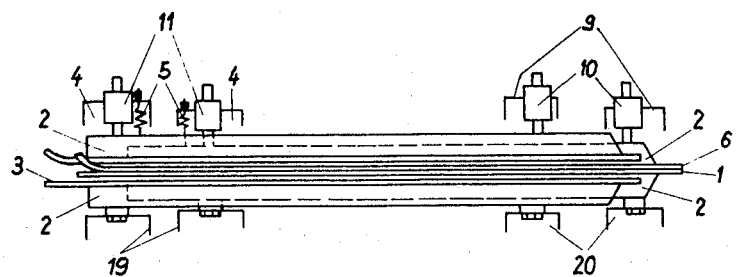
FIGURE 1 is a diagrammatic side view of a device according to the present invention.
Figure 2:
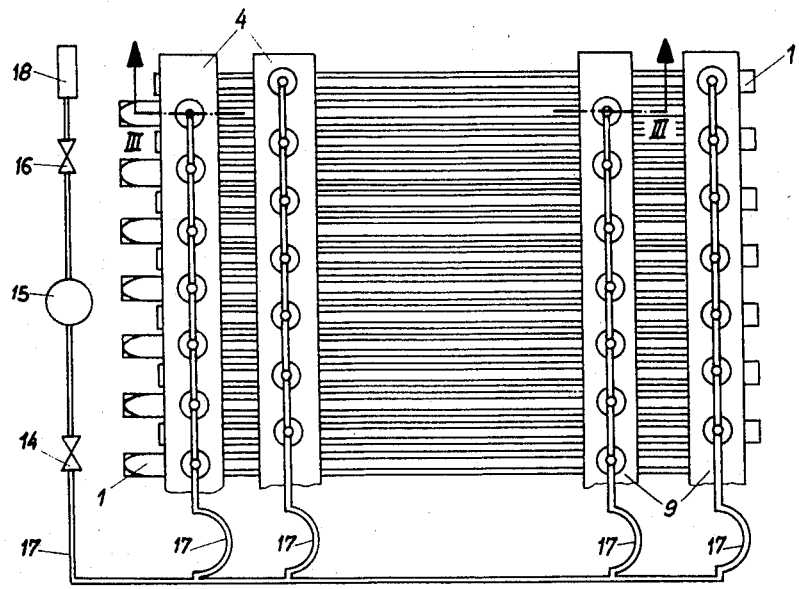
FIGURE 2 represents a top view of the arrangement of FIGURE 1.
Figure 3:
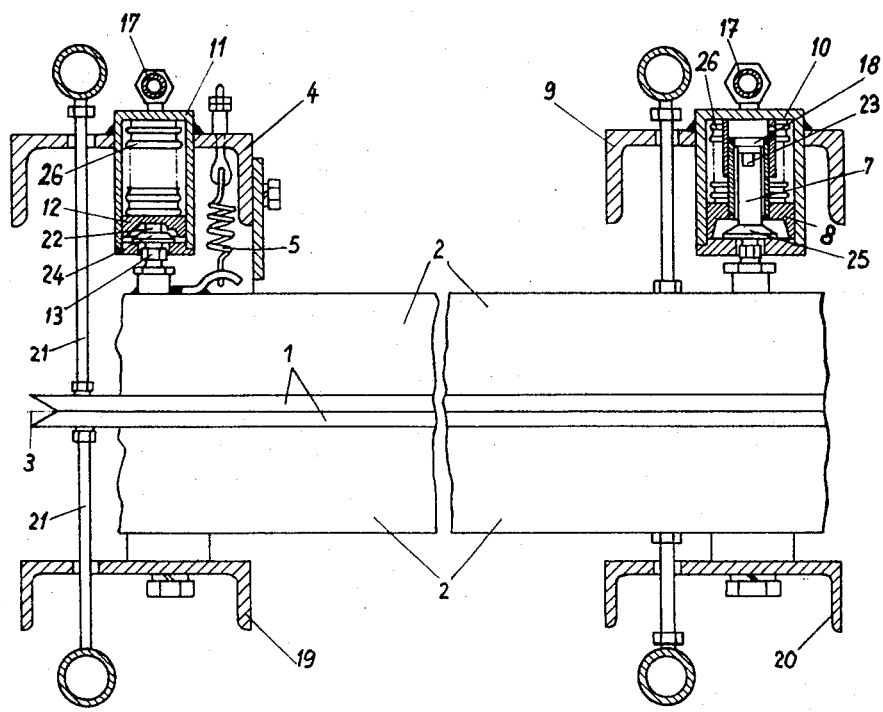

FIGURE 3 diagrammatically illustrates a section through the pressure cylinder of the device and is showing the support for the carrier rails.

The device according to the present invention is characterized primarily in that one pneumatically operable pressure cylinder each is arranged at the inlet and outlet side of a feeding or heating machine while the pressure cylinder is fixedly connected with the upper transverse beam. Furthermore, the invention comprises the arrangement of one step each on two different piston rods which when occupying their rest position rest upon the bottom of the pressure cylinders and on which the upper carrier rails firmly screwed to the piston rods are suspended.

Referring now to the drawings in detail, the arrangement shown therein comprises upper conveying or heating rails 1 which are reinforced by carrier rails 2. Rails 1 are resiliently suspended by tension springs 5 on a transverse beam 4 which is adjustable as to the height and is located at the entrance side 3 of the material to be treated. In contrast thereto, the conveying or heating rails 1 are at the exit side 6 non-resiliently suspended on piston rods 7 of pressure pistons 8 of transverse beams 9 which are likewise adjustable as to height. At the entrance side 3, pressure cylinders 11 are connected to transverse beam 4, and the pressure pistons 12 pertaining to said cylinders 11 are through the intervention of piston rods 13 operatively connected with the heating rails 1. Pressure cylinders 10 and 11 connected to transverse beams 4 and 9 are for purposes of a uniform pressure distribution interconnected through the intervention of an adjustable pressure reducing valve 14, and filter 15 and a valve 16, and by means of a conduit 17 are connected to a source of compressed air 18 common to said cylinders 10 and 11. The lower conveying or heating rails 1 which are likewise provided with carrier rails 2 are in a manner known per se nonmovably and firmly connected with the lower transverse beams 19 and 20 which are not adjustable as to height. The heating of rails 1 is effected, as shown in FIG. 3, through the intervention of a conduit 21 by means of a flowing heated-up medium. This heating arrangement, however, does not form a part of the present invention. Piston rods 7 and 13 are pivotally journalled on pressure pistons 8 and 12 of pressure cylinders 10 and 11 and, more specifically, at 22 and 23. In view of the heating of rails 1, it will be appreciated that during the operation, said rails will be subjected to slight changes in location. For this reason, the bearing portions 22 are provided with longitudinal slots in which the piston rods 7 are journalled which are firmly connected to heating rails 1. Pressure pistons 8 and 12 are each additionally provided with a step 24 and 25 which in rest position of said pistons rest on the bottom of pressure cylinders 10 and 11 respectively.

The operation of the pneumatically operable pressure control according to the present invention is as follows. In comformity with the thickness of the material to be treated, first the upper feeding or heating rails 1 are lifted by adjustment of transverse beams 4 and 9 which are adjustable as to height. This adjustment is so effected that the distance between the upper heating rails 1 from the lower heating rails will always be somewhat less than the thickness of the material to be treated. When the material to be treated is, for instance at the start of the gluing operation, inserted at the entrance side 3 between the lower and upper rails 1, the upper rails will first be slightly lifted at the entrance side 3 only whereby piston rods 7 and 13 will be tilted relative to pressure pistons 8 and 12. As soon as the material has been moved over a certain distance between the upper and lower rails, also the rear portion of the upper rails will be lifted during a further tilting of piston rods 7 and 13 relative to pressure pistons 8 and 12. When the material to be conveyed is over its entire length located between the upper and lower heating rails 1, it will be appreciated that due to the effected adjustment of the upper transverse beams 4 and 9, piston rods 7 and 13 will be in lifted position. This also applies to the abutments 24 and 25 on piston rods 7 and 13 which abutments have been lifted off from the bottom of pressure cylinders 10 and 11 in a corresponding manner.

As will furthermore be seen from the drawings, the arrangement shown therein also comprises bellows 26 which are located between the pressure cylinder and the cylinders 10, 11 and pressure pistons 8, 12 and surround the piston rod. These bellows 26 are resilient and are adapted to convey the pneumatic pressure.

As has been set forth above, the pressure of the upper rails which acts upon the material to be conveyed has to be adapted to the property or thickness of the material to be conveyed. This can be realized in a simple manner by adjusting the pressure acting upon the pressure pistons 8 and 12 by a corresponding actuation of pressure reducing valve 14.

As will be evident from the above, the arrangement according to the present invention is advantageous over heretofore known devices of the type involved with regard to the pressure control at the conveying or heating rails of the machine to such an extent that the slight increase in structural elements will be immaterial.

It is, of course, to be understood that the present invention is, by no means, limited to the particular arrangement shown in the drawings but also comprises any modifications within the scope of the appended claims.

What I claim is:

1. In a joint gluing machine, especially flat press: lower rail means, upper rail means substantially parallel to and arranged above said lower rail means, said upper and lower rail means being adapted to receive therebetween the material to be treated, a first group of spaced transverse beams arranged above and in spaced relationship to said upper rails, a second group of spaced transverse beams arranged below and in spaced relationship to said lower rail means, a first group of connecting means connecting said first group of transverse beams with said upper rail means, and a second group of connecting means connecting said second group of transverse beams with said lower rail means, one group of said groups of connecting means including pressure fluid operable cylinder piston means operable for exerting a controllable predetermined pressure upon the material to be treated via said rail means, said beams being adapted to move said rails relatively in the direction toward and away from each other and also in the longitudinal direction.

2. In a joint gluing machine, especially flat press: lower rail means, upper rail means substantially parallel to and arranged above said lower rail means, said upper and lower rail means being adapted to receive therebetween the material to be treated, a first group of spaced transverse beams arranged above and in spaced relationship to said upper rail means, a second group of spaced transverse beams arranged below and in spaced relationship to said lower rail means, a first group of connecting means connecting said first group of transverse beams with said upper rail means, and a second group of connecting means connecting said second group of transverse beams with said lower rail means, one group of said groups of connecting means including pressure fluid operable cylinder piston means operable for biasing said upper and lower rail means toward each other with a predetermined thrust, the other group of connecting means fixedly connecting the adjacent group of transverse beams and the adjacent rail means with each other, said beams being adapted to move said rails relatively in the direction toward and away from each other and also in the longitudinal direction.

3. In a joint gluing machine, especially flat press: lower rail means, upper rail means substantially parallel to and arranged above said lower rail means, said upper and lower rail means being adapted to receive therebetween the material to be treated, a first group of spaced transverse beams arranged above and in spaced relationship to said upper rail means, a second group of spaced transverse beams arranged below and in spaced relationship to said lower rail means, a first group of connecting means connecting said first group of transverse beams with said upper rail means, and a second group of connecting means connecting said second group of transverse beams with said lower rail means, said first group of said groups of connecting means including pressure fluid operable cylinder piston means operable for biasing said upper and lower rail means toward each other with a predetermined thrust, each of said cylinder piston means including a piston rod pivotally journalled on the piston of the respective cylinder piston means for movement in the longitudinal direction of the respective adjacent rail means, said beams being adapted to move said rails relatively in the direction toward and away from each other and also in the longitudinal direction.

4. An arrangement according to claim 3, in which the pivotal connection on the piston means is provided with a longitudinal slot in which the adjacent piston means fixedly connected to the respective adjacent rail means is journalled.

5. In a joint gluing machine, especially flat press: lower rail means, upper rail means substantially parallel to and arranged above said lower rail means, said upper and lower rail means being adapted to receive therebetween the material to be treated, a first group of spaced traverse beams arranged above and in spaced relationship to said upper rail means, a second group of spaced transverse beams arranged below and in spaced relationship to said lower rail means, a first group of connecting means connecting said first group of transverse beams with said upper rail means, a second group of connecting means connecting said second group of transverse beams with said lower rail means, one group of said groups of connecting means including pneumatically operable cylinder piston means operable for biasing said upper and lower rail means toward each other with a predetermined thrust, each of said cylinder piston means including a piston rod pivotally journalled on the piston of the respective cylinder piston means for movement in the longitudinal direction of the respective adjacent rail means, and resilient bellows, one bellows each being arranged between the cylinder and piston of each cylinder piston means for transmitting pneumatic pressure and sealing the respective adjacent piston, said beams being adapted to move said rails relatively in the direction toward and away from each other and also in the longitudinal direction.

6. In a joint gluing machine, especially flat press: lower rail means, upper rail means substantially parallel to and arranged above said lower rail means, said upper and lower rail means being adapted to receive therebetween the material to be treated, a first group of spaced transverse beams arranged transverse to and in spaced relationship to said upper rail means, a second group of spaced transverse beams arranged below and in spaced relationship to said lower rail means, a first group of connecting means connecting said second group of transverse beams with said upper rail means, a second group of connecting means connecting said second group of transverse beams with said lower rail means, one group of said groups of connecting means including pneumatically operable cylinder piston means operable for biasing said upper and lower rail means toward each other with a predetermined thrust, each of said cylinder piston means including a piston rod pivotally journalled on the piston of the respective cylinder piston means for movement in the longitudinal direction of the respective adjacent rail means, and conduit means interconnecting all of said cylinder piston means associated with one and the same rail means for establishing a uniform pressure distribution, said beams being adapted to move said rails relatively in the direction toward and away from each other and also in the longitudinal direction.

7. An arrangement according to claim 6, in which said conduit means has interposed therein a reducing valve, a filter and a shutoff valve and is adapted to be connected to a source of compressed air.

8. In a joint gluing machine, especially flat press: lower rail means, upper rail means substantially parallel to and arranged above said lower rail means, said upper and lower rail means being adapted to receive therebetween the material to be treated, a first group of spaced transverse beams arranged above and in spaced relationship to said upper rail means, a second group of spaced transverse beams arranged below and in spaced relationship to said lower rail means, a first group of connecting means connecting said first group of transverse beams with said upper rail means, a second group of connecting means connecting said second group of transverse beams with said lower rail means, said first group of said groups of connecting means including pneumatically operable cylinder piston means operable for biasing said upper rail means toward said lower rail means with a predetermined thrust, and resilient means resiliently suspending said upper rail means at one end to the adjacent transverse beams said beams being adapted to move said rails relatively in the direction toward and away from each other and also in the longitudinal direction.

References Cited

UNITED STATES PATENTS

| | | | |
|---|---|---|---|
| 856,416 | 6/1907 | McLarty | 144—281 |
| 2,782,818 | 2/1957 | Christeson | 156—583 |
| 2,874,751 | 2/1959 | Norton. | |

DOUGLAS J. DRUMMOND, *Primary Examiner.*

U.S. Cl. X.R.

100—214; 144—281